Patented Nov. 28, 1944

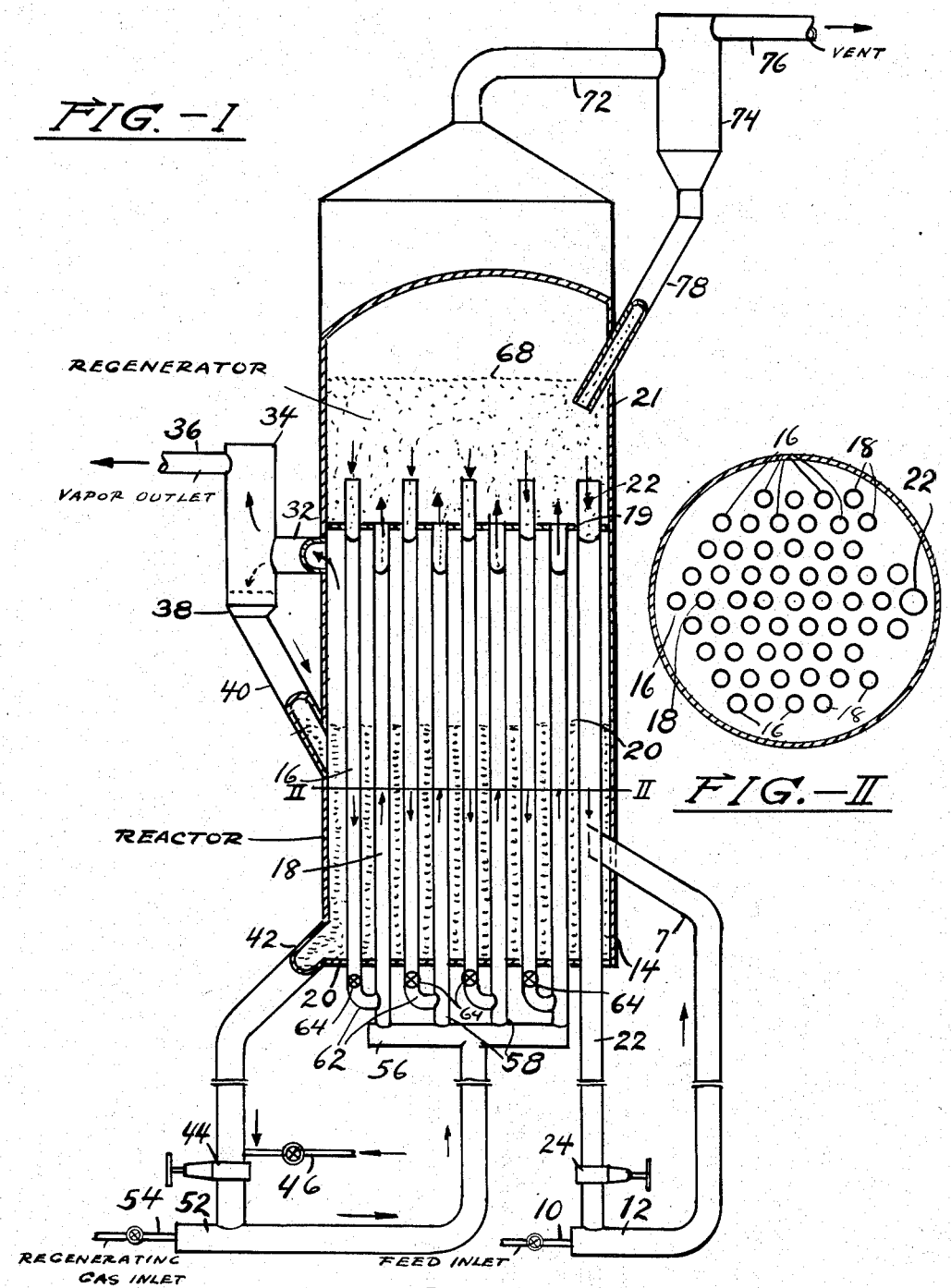

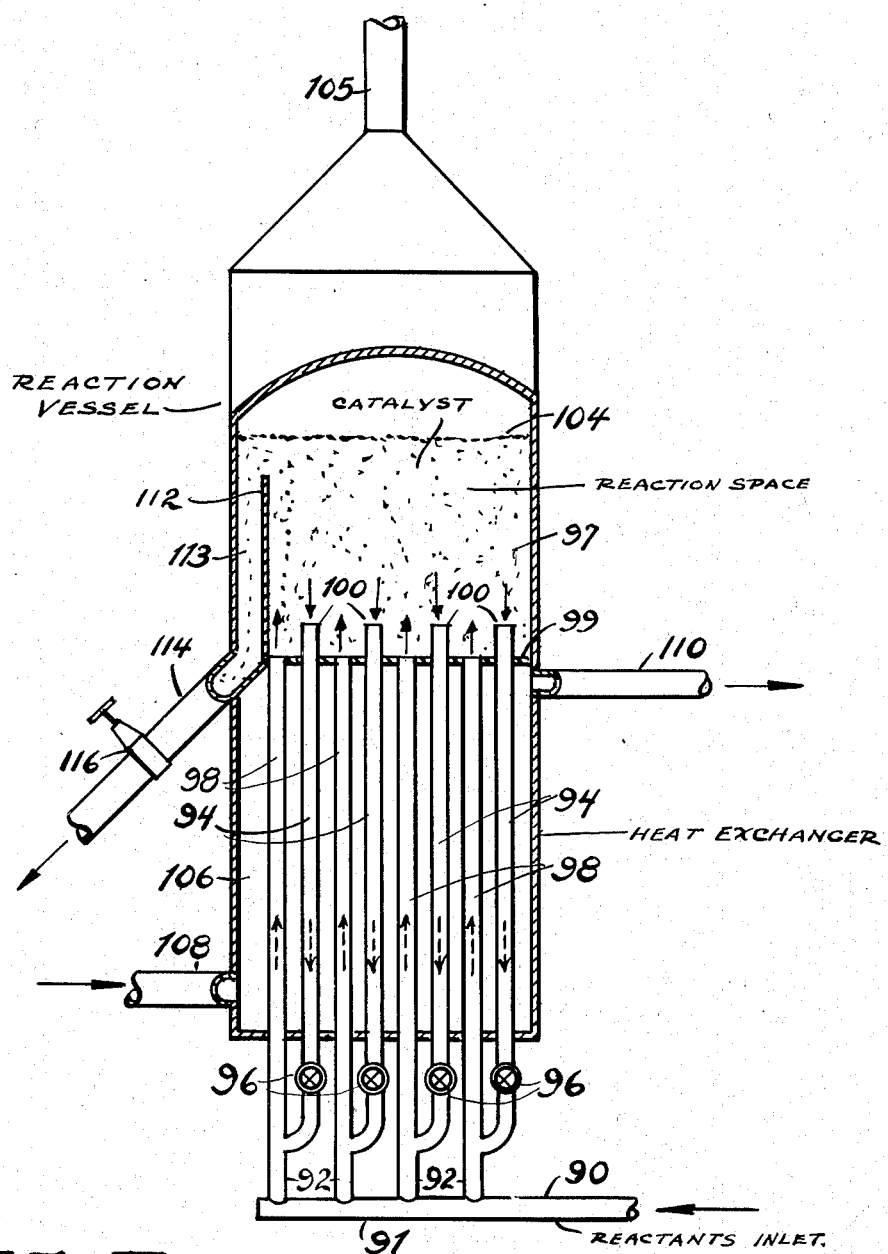
FIG.-III

2,363,874

UNITED STATES PATENT OFFICE 2,363,874

PROCESS AND APPARATUS FOR TREATING FLUIDS

Robert W. Krebs, Baton Rouge, La., assignor to Standard Oil Development Company, a corporation of Delaware Application July 30, 1942, Serial No. 452,826

10 Claims. (Cl. 196—52)

This invention relates to carrying out catalytic reactions wherein the temperature during reaction is controlled.

In reactions which are highly exothermic or endothermic it is essential to maintain the temperature of the reaction at the desired level so as to avoid formation of undesirable by-products or spoiling of the catalyst or other undesirable results. For example, in the catalytic reaction between carbon monoxide and hydrogen the reaction is exothermic and if the temperature during the reaction is not carefully controlled, lower yields of desired products are obtained.

In the regeneration of catalyst used in the catalytic conversion of hydrocarbons it is important to control the temperature during regeneration as the reaction is highly exothermic. If the temperature is not controlled it may rise too high and damage the catalyst. The catalytic conversion of hydrocarbons such as catalytic cracking is endothermic and it is preferred to add heat during the cracking operation to maintain the desired conversion.

According to the preferred form of my invention, the regeneration of the catalyst is carried out in a regeneration zone and the conversion of hydrocarbons is carried out in the same vessel so that heat exchange is obtained between the conversion and regeneration by indirect heat exchange relation. In this way the temperature during regeneration is controlled and prevented from rising too high and at the same time heat is supplied to the endothermic reaction of the conversion of the hydrocarbons.

In another form of the invention the catalyst particles are maintained in a reaction zone and heat is supplied or removed from the reaction zone by heat exchange between the catalyst and a heat exchange medium. This form of the invention is especially adapted for operations using catalysts which do not foul rapidly and which require regeneration only after long periods of use. This form of invention as well as the first form is adapted for use with reactions which are highly exothermic or endothermic.

In the drawings:

Fig. 1 represents a vertical longitudinal cross-section of apparatus adapted for carrying out my invention;

Fig. 2 represents a horizontal transverse cross-section taken substantially on line 2—2 of Fig. 1; and Fig. 3 represents a vertical longitudinal section of another form of apparatus adapted for using my invention.

Referring now to the drawings, the reference character 10 designates a feed line for introducing the reactants into the system. The invention may be used with any catalytic reactions but is especially adapted for carrying out the catalytic cracking of hydrocarbons. The feed passing through line 10 may be hydrocarbon vapors at reaction temperature or the feed may be partly preheated liquid oil which is vaporized and raised to the cracking temperature by admixture with hot regenerated catalyst.

The oil feed is introduced into line 12 where it is mixed with powdered catalyst and the mixture introduced into a reaction zone 14 which comprises the space around tubes 16 and 18 and has a closed top 19 comprising a tube sheet through which the tubes 16 and 18 extend. The reaction zone 14 has a closed bottom 20 comprising another tube sheet through which the other ends of tubes 16 and 18 extend. The tubes 16 and 18 are vertically arranged and are used to convey hot regenerated powdered catalyst or powdered catalyst being regenerated so as to supply heat to the reaction zone by indirect heat exchange. These tubes will be more fully described hereinafter.

The catalyst used may be any suitable catalyst such as acid treated bentonite clays, synthetic gels comprising silica and alumina or silica and magnesia, or the like. The powdered catalyst is preferably of such size that it passes entirely through 100 standard mesh with less than about 25% of a size between 0 to 20 microns.

In the reaction zone 14 the powdered catalyst is maintained in a fluidized condition by maintaining the velocity of the vapors passing through the reaction zone at about 0.1 foot per second to 1.5 feet per second. Under these conditions the fluidized catalyst simulates a liquid and has a level 20 similar to that of a liquid.

Hot regenerated catalyst is withdrawn from the bottom portion of a regeneration zone 21 by means of a standpipe 22 having a slide control valve 24 at its lower end to supply controlled amounts of the catalyst to the reaction zone.

The products of reaction in vapor form leave the top of the reaction zone below sheet 19 through line 32 and contain some entrained catalyst particles. The vapor reaction products are passed to suitable separating equipment 34 for separating entrained particles from the reaction products. The reaction products pass through line 36 to suitable fractionating equipment to separate the desired motor fuel from other fractions. The separating equipment may comprise one or more cyclone separators or a Cottrell precipitator or other separation equipment. The separated catalyst particles collect in the bottom 38 of the separation equipment and are removed therefrom and passed through line 40 for return to the reaction zone 14.

As the amount of entrained catalyst is small when the velocity of the vapors is low, it is necessary to have only one cyclone separator or one Cottrell precipitator. If larger amounts of catalyst are entrained, it may be desirable to include more than one cyclone separator or a cyclone separator and a Cottrell precipitator.

During the conversion operation the catalyst particles become contaminated with carbonaceous material and it is necessary to regenerate the catalyst before reusing it in another conversion operation. The spent or contaminated catalyst is withdrawn from the bottom of the reaction zone as a dense fluidized mixture through line 42 which comprises a standpipe. The standpipe is provided with a slide control valve 44 for controlling the amount of catalyst withdrawn from the standpipe 42. Preferably a stripping gas such as steam is introduced at the bottom of the standpipe through line 46 above the slide valve 44 for stripping the spent catalyst and removing volatile constituents therefrom.

The spent catalyst is introduced from the standpipe 42 into line 52 where it is mixed with regenerating gas such as air or other oxygen-containing gas for burning off the carbonaceous material from the catalyst. The mixture of catalyst and regenerating gas is passed to a manifold 56 from which it passes into the lower end 58 of the vertically arranged tubes 18. The tubes 16 and 18 communicate at the bottom thereof by a return duct 62. The tubes 16 extend above plate 19 and communicate with the regeneration zone 21 and are adapted to withdraw regenerated catalyst from the regeneration zone in a relatively dense condition. The tops of tubes 18 are flush with sheet 19 and open into the bottom of the regenerator. The amount of catalyst passing downwardly through the tubes 16 is controlled by slide valves 64. It is obvious that the rate of heat transfer may be controlled by regulating the amount of catalyst flowing through the slide valves 64.

A heat balance may be obtained in the apparatus used for practicing my invention in various ways. The inlet temperature of the oil as well as the fraction of the oil vaporized may be regulated; the temperature of the inlet regenerating gas temperature may be regulated; or the temperature of the vent gas from the regeneration zone 21 may be regulated.

Each tube 18 has an open lower end 58 for introducing spent catalyst and regenerating gas into the tubes 18. That is, for each pair of tubes 16 and 18, spent catalyst is mixed with regenerated catalyst and the mixture is introduced into the bottom portion of each of the tubes 18 and passed into the bottom portion of the regeneration zone 21 where the spent catalyst is regenerated. It will be seen that the downflowing fluidized mixture in each tube 16 is much more dense than the fluidized mixture in the other tube 18 as the catalyst mixture in each tube 18 has a gas mixed therewith and in this way the catalyst is caused to circulate through the tubes from the regeneration zone and back to the regeneration zone. The tubes 16 and 18, sheet 19 and associated parts are very similar to that used in the manufacture of tube bundles for heat exchangers.

In the regeneration zone 21 the catalyst particles undergoing regeneration are maintained as a dry fluidized mixture by maintaining the velocity of the regenerating gas at a velocity of about 0.1 foot per second to 1.5 feet per second. Under these conditions the fluidized catalyst assumes a level 68, which is maintained by balancing the rate of withdrawal of catalyst through line 22 with the rate of feed of catalyst through line 52. Regeneration gases containing some entrained catalyst pass overhead through line 72 to a separating means 74 which may be a cyclone separator, a plurality of cyclone separators or other suitable separation equipment. Under the conditions above given only small amounts of catalyst will be entrained in the regeneration gases and preferably a Cottrell precipitator is used alone. When more catalyst is entrained, preferably one or more cyclones and a Cottrell precipitator are used. The regeneration gases pass overhead through line 76 and the separated regenerated catalyst particles are withdrawn from the bottom of the separation equipment and passed through line 78 into the body of the catalyst particles undergoing regeneration in the regeneration zone 21.

The standpipe 22 above described extends upwardly beyond tube sheet 19 into the lower portion of the fluidized catalyst undergoing regeneration in the regeneration zone 21 and regenerated catalyst is withdrawn through the standpipe 22. During regeneration, it is preferred to maintain the temperature below about 1200° F. and preferably below about 1150° F. During conversion, as for example, in the catalytic cracking of gas oil to make motor fuel the temperature during conversion is about 900° F. to 1000° F. The regeneration of the spent catalyst is exothermic and the catalytic cracking of hydrocarbons is endothermic.

By providing the tubes 16 and 18 which extend from the regeneration zone 21 through the reaction zone 14 it is possible to carefully control the temperature during regeneration and at the same time add heat to the reaction zone for the catalytic conversion of hydrocarbons. It will also be seen that the regenerated catalyst is circulated through the tubes 16 and 18 without any circulating apparatus such as pumps or the like as the circulation is obtained by the different densities of the material in the tubes 16 and 18. Instead of having the regeneration zone above the reaction zone it is within the contemplation of my invention to reverse these zones and have the regeneration zone surround the tubes 16 and 18 and have the reaction zone located at the top of the vessel.

Referring now to Fig. 3, there is shown another form of apparatus in which the catalyst particles are maintained in a fluidized condition in a reaction zone for an extended time and tubes are provided for circulating the catalyst particles from the reaction zone through a heat exchange tube arrangement. This form of the invention is especially adapted for highly exothermic or endothermic reactions in which the catalyst particles are not quickly contaminated and the catalyst particles may be used for relatively long periods of time without need of regeneration. However, the apparatus may also be used for carrying out reactions such as catalytic conversion of hydrocarbons where the catalyst is quickly contaminated with carbonaceous deposits. In such cases the contaminated catalyst is preferably withdrawn in the dense phase, passed to another similar apparatus wherein it is regenerated and the temperature is controlled during regeneration and the regenerated catalyst then returned to the reaction zone.

The reference character 90 designates a line for introducing gaseous or vapor reactants to a manifold 91 from which the reactants are introduced into tubes 92. Catalyst particles in a relatively dense fluidized condition are maintained in other vertically arranged tubes 94 acting as standpipes and having control valves 96 for controlling the amount of catalyst withdrawn from the tubes 94. The tubes 94 at their upper ends communicate with the reaction zone 97 and are adapted to conduct catalyst downwardly and to introduce the catalyst particles into the lower ends of the tubes 98 through which the mixture passes upwardly to the reaction zone 97. Tubes 94 extend beyond tube sheet 99 as indicated at 100. The upper ends of tubes 98 are flush with sheet 99 and open into the bottom of the reaction zone 97. The fluidized catalyst mixture in the tubes 94 is much more dense than the catalyst mixture in the other tubes 98 and as a result the catalyst is circulated from the reaction zone through the tubes and back to the reaction zone. The gaseous or vapor reactants introduced through lines 92 are mixed with the catalyst at the base of tubes 98 and carry the catalyst back to the reaction zone 97.

The velocity of the vapors passing through the reaction zone 97 is so selected that the finely divided catalyst particles are maintained in a fluidized condition similar to a liquid and have a level 104. Products of conversion in vapor form pass overhead through line 105. Suitable separation equipment may be provided for separating entrained catalyst particles from the reaction products.

Surrounding the vertically arranged tubes 94 and 98 is a heat exchange apparatus 106 having an inlet 108 and an outlet 110. Heat exchange medium is introduced into the heat exchange equipment 106 through line 108 and passes around the outside of the tubes 94 and 98 and then leaves the heat exchanger 106 through line 110. With this heat exchange equipment the temperature of the reaction is controlled and is maintained at the desired level. Preferably, liquid heat exchange mediums are used and where high temperatures are to be used molten salts, alloys, mercury or other high temperature liquids may be used.

While the form of the invention shown in Fig. 3 is especially adapted for use with reaction in which the catalyst does not foul rapidly, it may also be used for reactions in which the catalyst is rapidly contaminated. In the latter case a baffle or partition 112 is provided in the reaction zone 97 to provide a withdrawal chamber 113 for withdrawing the catalyst as a relatively dense fluidized mixture. The fluidized mixture is passed through line 114 having a slide control valve 116 and then passed through a suitable regeneration zone similar to the apparatus shown in Fig. 3. In such an apparatus the temperature during regeneration would be controlled by the heat exchange equipment similar to that shown at 106 in Fig. 3 and after regeneration the regenerated catalyst would be withdrawn by means similar to the partition 112 and drawoff tube 114 and returned to the reaction zone 97.

While the invention has been specifically described in connection with catalytic conversion of hydrocarbons, it is to be understood that this is merely by way of example and the invention is not restricted thereto. Also, while two forms of apparatus have been shown for practicing my invention, it is to be understood that various changes may be made without departing from the spirit of the invention.

I claim:

1. A process of the character described which comprises maintaining finely divided catalyst as a fluidized mixture in a reaction zone, passing a plurality of streams of catalyst downwardly from said reaction zone and mixing a reactant with each stream of catalyst, returning the mixture of catalyst and reactant as a plurality of streams to said reaction zone and disposing the downwardly and upwardly moving streams in indirect heat exchange with a heat exchange medium.

2. A process for catalytic conversion of hydrocarbons which comprises maintaining a fluidized mixture of catalyst particles and hydrocarbons in a reaction zone, maintaining another fluidized mixture of catalyst particles and regenerating gas in a regeneration zone, withdrawing regenerated catalyst from said regeneration zone in a plurality of downwardly moving streams, adding spent catalyst particles and a regenerating gas to the withdrawn streams of regenerated catalyst and passing the resulting mixture upwardly as a plurality of streams to said regeneration zone, the reaction zone being arranged around the upwardly and downwardly moving streams and in indirect heat exchange therewith to receive heat from the hot regenerated catalyst.

3. A process for the catalytic conversion of hydrocarbons which comprises maintaining a fluidized mixture of catalyst particles and hydrocarbons in a reaction zone, maintaining another fluidized mixture of catalyst particles undergoing regeneration in a regeneration zone, withdrawing hot regenerated catalyst from said regeneration zone as a relatively dense mixture in a plurality of downwardly moving streams, adding a gas to the withdrawn streams of regenerated catalyst and returning the resulting mixture as a plurality of upwardly moving streams to said regeneration zone, the reaction zone surrounding the upwardly and downwardly moving streams of regenerated catalyst and being in indirect heat exchange therewith to receive heat from the hot regenerated catalyst.

4. A process for the catalytic conversion of hydrocarbons which comprises maintaining a fluidized mixture of catalyst particles and hydrocarbons in a reaction zone, maintaining another fluidized mixture of catalyst particles undergoing regeneration in a regeneration zone, withdrawing contaminated catalyst from said reaction zone as a relatively dense mixture in a plurality of downwardly moving streams, adding a gas to the withdrawn streams of contaminated catalyst and returning the mixture as a plurality of upwardly moving streams to said reaction zone, the regeneration zone surrounding the upwardly and downwardly moving streams of catalyst and being in indirect heat exchange therewith.

5. A process for catalytic conversion of hydrocarbons which comprises maintaining a fluidized mixture of catalyst particles and hydrocarbons in a reaction zone, withdrawing spent catalyst from said reaction zone and passing it to a regeneration zone, maintaining another fluidized mixture of catalyst particles in said regeneration zone, withdrawing at least part of the hot regenerated catalyst particles and passing them to said reaction zone, withdrawing another part of the hot regenerated catalyst particles in a plurality of downwardly moving streams, adding a gas to the withdrawn streams and returning the mixture as a plurality of streams to said regeneration zone, the reaction zone surrounding the upwardly and downwardly moving streams and being in indirect heat exchange therewith.

6. An apparatus of the character described including a vessel provided with a reaction zone, a plurality of vertical tubes extending downward from said reaction zone and adapted to conduct catalyst particles downwardly, means for adding a gas at the lower portion of each of said tubes to make a lighter suspension of catalyst particles, other vertically arranged tubes communicating with said first mentioned tubes for returning the lighter suspension of catalyst to said reaction zone, another reaction zone surrounding at least a portion of all of said tubes and adapted to contain fluidized catalyst particles, means for removing catalyst from said second reaction zone and passing it to said first mentioned reaction zone, and means for removing catalyst from said first mentioned reaction zone and passing it to said second reaction zone.

7. An apparatus of the character described including a vessel provided with a reaction zone, a plurality of vertical tubes extending downward from said reaction zone and adapted to conduct subdivided particles downwardly, means for adding a gas at the lower portion of each of said tubes to make a lighter suspension of subdivided particles, other vertically arranged tubes communicating with said first mentiond tubes for returning the lighter suspension of subdivided particles to said reaction zone, a chamber surrounding at least a portion of all of said tubes and adapted to hold a heat exchange medium for controlling the temperature of the subdivided particles in said tubes and means for withdrawing subdivided particles from said reaction zone.

8. A process of the character described which comprises maintaining subdivided catalytic material in a relatively dense fluidized condition in a zone, withdrawing catalytic material downwardly from the bottom portion of said zone in a plurality of streams in a dense fluidized condition, mixing gaseous material with each stream at a low point to reduce the density of the dense fluidized catalytic material and returning the less dense fluidized catalytic material in a plurality of streams upwardly to said zone and disposing the downwardly and upwardly moving streams in indirect heat exchange with a heat exchange medium.

9. A process for catalytic conversion of hydrocarbons which comprises maintaining a fluidized mixture of catalyst particles and hydrocarbons in a reaction zone, maintaining another fluidized mixture of catalyst particles and regenerating gas in a regeneration zone, withdrawing regenerated catalyst from said regeneration zone in a plurality of downwardly moving streams, adding spent catalyst particles and a regenerating gas to the withdrawn streams of regenerated catalyst and passing the resulting mixture upwardly as a plurality of streams to said regeneration zone, the reaction zone being arranged around the upwardly and downwardly moving streams and in indirect heat exchange therewith to effect heat exchange between the fluidized mixture in said reaction zone and the catalyst particles in the upwardly and downwardly moving streams.

10. In a process for carrying out catalytic reactions, the steps which comprise maintaining a fluidized mixture of catalyst particles and a gaseous fluid reactant in a reaction zone in which the catalyst particles become deactivated, maintaining another fluidized mixture of catalyst particles in a regeneration zone, withdrawing hot regenerated catalyst from said regeneration zone as a relatively dense mixture in a plurality of downwardly moving streams, adding a gas to the withdrawn streams of regenerated catalyst and returning the resulting mixture as a plurality of upwardly moving streams to said regeneration zone, said reaction zone surrounding the upwardly and downwardly moving streams of regenerated catalyst and being in indirect heat exchange therewith.

ROBERT W. KREBS.